United States Patent [19]

Rüssel et al.

[11] Patent Number: 5,002,640

[45] Date of Patent: Mar. 26, 1991

[54] PROCESS FOR THE PRODUCTION OF NITRIDES SUITABLE FOR CERAMIC MATERIALS

[75] Inventors: Christian Rüssel; Michael Seibold, both of Nurnberg, Fed. Rep. of Germany

[73] Assignee: Fraunhofer-Gesellschaft Zur Forderung Der Angewandten Forschung E. V., Munich, Fed. Rep. of Germany

[21] Appl. No.: 316,914

[22] Filed: Feb. 28, 1989

[30] Foreign Application Priority Data

Mar. 7, 1988 [DE] Fed. Rep. of Germany ....... 3807419

[51] Int. Cl.$^5$ .............................................. C25B 3/12
[52] U.S. Cl. ........................... 204/59 QM; 204/59 R; 204/59 M; 204/58.5
[58] Field of Search ................. 204/58.5, 59 R, 59 M, 204/59 QM, 58.5

[56] References Cited

U.S. PATENT DOCUMENTS

| | | | |
|---|---|---|---|
| 3,954,577 | 5/1976 | Levine | 204/59 R |
| 4,650,777 | 3/1987 | Kurokawa | 501/96 |
| 4,740,574 | 4/1988 | Bolt et al. | 501/99 |
| 4,784,839 | 11/1988 | Bachelard et al. | 423/290 |
| 4,851,203 | 7/1989 | Bachelard et al. | 423/291 |

Primary Examiner—John F. Niebling
Assistant Examiner—Steven P. Marquis
Attorney, Agent, or Firm—Oblon, Spivak, McClelland, Maier & Neustadt

[57] ABSTRACT

A process for the production of nitrides for ceramic materials, in particular ALN, is described in which the element to be converted to the nitride is anodically oxidized. This oxidation is carried out in the presence of a nitrogen compound which can be reduced under the electrolysis conditions and of a substance which increases the conductivity. The electrolysis is followed, if necessary, by removal of volatile constituents and calcination of the product.

21 Claims, 1 Drawing Sheet

PROCESS FOR THE PRODUCTION OF NITRIDES SUITABLE FOR CERAMIC MATERIALS

The present invention relates to the production of nitrides, in particular a process for the production of nitrides which can be used in ceramic materials. The nitrides which can be obtained by this process and their use in the production of ceramic materials and coatings is likewise the subject of the present invention. A particularly preferred nitride in this connection is aluminum nitride.

There has been a considerable interest in ceramic materials as raw materials for the most varied fields of application, particularly in recent times. Although of relatively low weight, these ceramic raw materials are notable, for example, for high strength at high temperatures, high thermal conductivity and/or high chemical resistance, and can consequently be used very advantageously, inter alia, as high-temperature raw materials, substrate materials in electronics and as crucible materials for metallurgy. The considerable interest in ceramic materials is, however, offset by a certain deficiency in production know-how, and this has the consequence that both the production processes as such and also the products produced thereby are afflicted with serious disadvantages in a number of respects.

For example, aluminum nitride is at present produced industrially exclusively by a high-temperature process, i.e. by a process in which aluminum nitride has to be exposed to temperatures above 1,100° C., since at lower temperatures aluminum nitride is not obtained, or is not obtained in the required yield. This applies, for example, to the processes in which aluminum nitride is prepared from aluminum oxide, nitrogen and carbon, from aluminum and nitrogen, from aluminum sulfide and ammonia and from aluminum halide and ammonia as starting materials. At the same time, a disadvantage of these high temperatures is that the aluminum nitride thus obtained has a relatively low sintering activity and cannot be sintered pressurelessly without adding sintering aids. In addition, powders which are produced at high temperatures can generally only be comminuted with high grinding costs. At the same time, the abrasion of the grinding bodies associated herewith results in contamination of the powder and of the ceramic sintered therewith. Although the powders obtained in the case of the production of aluminum nitride from aluminum halides and ammonia can be produced with high purity and with fine grain size, these too have little sintering activity and are very prone to agglomerate formation owing to the high specific surfaces. In addition, they have a low bulk density and are difficult to press-mold. Moreover, this method of production requires highly elaborate apparatus since the aluminum nitride is produced in a gas-phase reaction and large reactors are consequently necessary for production on an industrial scale.

Although other processes described in the literature for the production of aluminum nitride do make use of temperatures below 1,100° C., they are based in some cases on expensive starting materials which are costly to produce and which are moreover difficult to handle and extremely susceptible to oxidation (for example, alans or trialkylaluminum compounds). Other processes which have been proposed involve the reaction of aluminum or aluminum halides with potassium amides and therefore result in alkali contamination, for which reason they are unsuitable for the production of high-purity powders. In addition, the handling of potassium amide also presents problems. All the processes proposed in the literature use liquid ammonia as reaction medium and are therefore relatively costly processes. This may also be the reason for the fact that the lastmentioned processes have not hitherto been used for the industrial production of aluminum nitride.

The object of the present invention is accordingly to provide a process for the production of nitrides, in particular aluminum nitride, suitable for ceramic materials, which process is free of the abovementioned disadvantages which can also be observed in identical or modified form in the production of nitrides differing from aluminum nitride.

Figure 1:
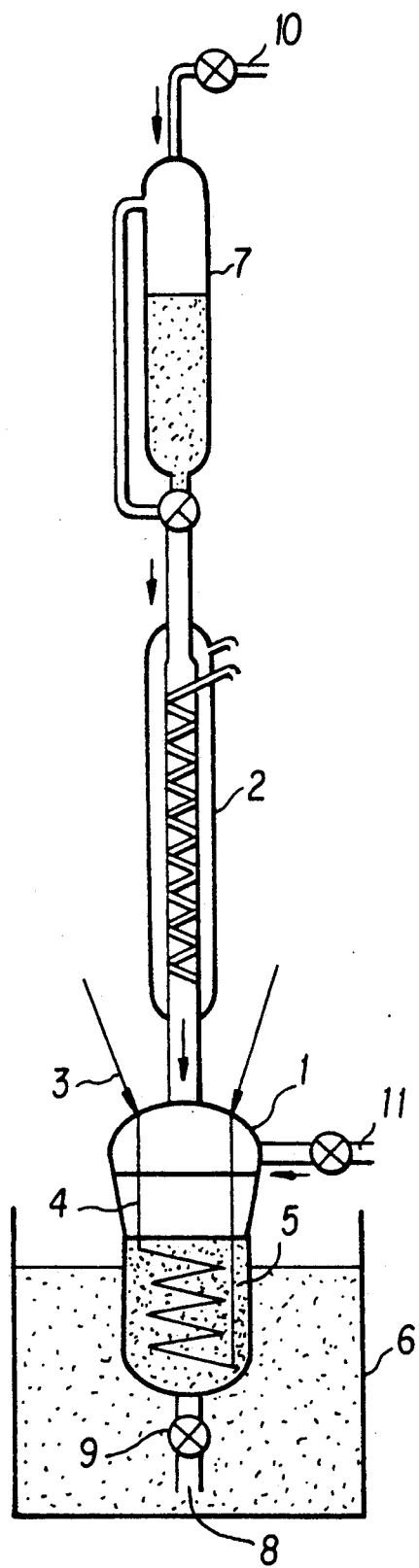
FIG. 1 illustrates an arrangement for performing the electrolysis in accordance with the present invention.

The subject of the present invention is a process for the production of nitrides or nitride precursors suitable for ceramic materials which comprises performing an electrolysis in which at least one element which can be used in a ceramic material and which is solid under normal conditions is anodically oxidized in the presence of at least one nitrogen compound, which is reduced under the electrolysis conditions, and at least of one substance which increases the conductivity.

In principle, any element which can be used in ceramic materials and is solid under normal conditions, i.e. in particular, not a gas, is suitable as the element to be oxidized anodically in the process according to the invention.

According to the invention, preferred elements are calcium, magnesium, boron, aluminum, gallium, silicon, tin, vanadium, titanium, zirconium, chromium, molybdenum, tungsten, yttrium, niobium, tantalum, zinc and the lanthanides, or combinations of these elements. Particularly preferred among these elements are boron, aluminum, silicon and titanium, especially aluminum.

In the process according to the invention, the elements are not necessarily present as pure elements, but may also be present, for example, in the form of binary, ternary and higher systems, in particular alloys. The use of alloys is especially indicated if the element to be converted into a nitride has an inadequate or unsatisfactory conductivity for the electrolysis, as may be the case, for example, with silicon and boron. Accordingly, in such cases, use is made, for example, of aluminum/boron or aluminum/silicon alloys. Obviously, elements which have an adequate conductivity for the electrolysis may also be used in combination with other adequately conductive elements. As an example of this, an aluminum/calcium alloy may be cited.

In choosing the components of a binary or higher system, attention is primarily paid to the fact that use is made, in particular, of those elements whose presence in the subsequent ceramic final product is in any case desirable. Equally, the desired chemical purity of the nitride to be produced determines the grade of purity in which the element used is present. The purer the nitride is required to be, the purer the element present which has to be oxidized also has to be.

If high requirements are imposed on the purity of the nitride product, however, it is not only the purity of the element to be oxidized which is of importance, but steps also have to be taken to ensure that the other materials to be used in the process according to the invention are available in the required purity and, in particular, do not contain any contaminants which cannot be completely volatilized at elevated temperatures, possibly with decomposition.

In particular, if the nitride product is required to be free of corresponding oxidic contaminants, steps must be taken to ensure that the electrolysis and the stages which possibly follow it are performed with as complete exclusion of water (moisture) and (atmospheric) oxygen as possible. This means that in this case only carefully dried substances (in the case of liquids, for example, dried with molecular sieves) which have been freed from dissolved oxygen, if necessary, by vacuum treatment or passing, for example, nitrogen through them, are used. It is also advisable to flush the electrolysis cell with nitrogen or an inert gas before the electrolysis and to perform the electrolysis under an oxygen-free protective gas.

The following embodiments relate, in particular, to the production of aluminum nitride, but are also applicable correspondingly to the production of other nitrides.

Nitrogen compounds which can be used in the process according to the invention are in principle all those which are reduced under the electrolysis conditions. Preferably, they should, however, carry at least one hydrogen atom on the nitrogen atom. Accordingly, nitrogen compounds preferred according to the invention are primary or secondary, aliphatic, aromatic or araliphatic amines or $NH_3$ or mixtures of these compounds. Particularly preferred nitrogen compounds are amines having the general formula NRR'H, in which R is a straight-chain or branchedchain, optionally unsaturated alkyl group, cycloalkyl group, aralkyl or aryl group or forms an alkylene group together with R', and R' stands for hydrogen or has the meanings specified for R.

Preferred (optionally unsaturated) alkyl groups are alkyl of 1 to 12, preferably 1 to 6, and in particular, 1 to 4 C atoms, for example, methyl, ethyl, npropyl, isopropyl, n-butyl, isobutyl, sec-butyl, tertbutyl, pentyl, hexyl, octyl, decyl; alkenyl and alkynyl of up to 12, preferably up to 6, and, more preferably, up to 4 C atoms such as allyl and propargyl.

Preferred cycloalkyl groups have 3 to 10, in particular 5 to 8, carbon atoms. Examples of these are cyclopentyl, cyclohexyl and cyclohexenyl.

Alkylene groups are preferably those having 2 to 10, in particular 3 to 6, C atoms which may optionally be interrupted by a hetero atom, in particular —O—, —NR'—, —S—. Examples of such groups are propylene, butylene, pentylene and 3-oxapentylene.

The preferred aryl groups have 6 to 20 and, in particular, 6 to 10 carbon atoms. Phenyl, toluyl, xylyl and naphthyl may be cited as examples of these.

The preferred aralkyl groups are derivatives from the preferred alkyl and aryl radicals mentioned above. Examples of these are benzyl and 2-phenylethyl.

The above groups may be substituted with one or more radicals which are inert under the reaction conditions, for example, with F, Cl, Br, I, $C_{1-4}$-alkoxy, for example methoxy and ethoxy, CN and $NO_2$. If the nitride to be produced is required to have a high purity, no elements other than N, C and H are preferably present in the nitrogen compound.

Aliphatic or aromatic polyamines, i.e. a compound containing more than one $NH_2$ or NHR group per molecule, may also be used as nitrogen compounds.

Heterocyclic amines may also be used according to the invention.

Specific examples of nitrogen compounds preferred according to the invention are methylamine, dimethylamine, ethylmethylamine, ethylamine, diethylamine, npropylamine, di-n-propylamine, n-butylamine, di-n-butylamine, isobutylamine, diisobutylamine, sec-butylamine, disec-butylamine, tert-butylamine, hexylamine, octylamine, cyclohexylamine, dicyclohexylamine, pyrrolidine, piperidine, morpholine, aniline, N-methylaniline, N-ethylaniline, diphenylamine, benzylamine, dibenzylamine, N-methylbenzylamine, ethylenediamine, 1,2-propylenediamine, 1,3-propylenediamine, butylenediamines, hexylenediamines, hexamethylenetetramine, pyrrole, imidazol and pyridine. Particularly preferred are the (cyclo)alkylamines and di(cyclo)alkylamines which are liquid or solid at room temperature, and also benzylamine and aniline.

Obviously, mixtures of nitrogen compounds may also be used according to the invention.

According to the invention, the amount of nitrogen compound used is not critical, preferably, however, at least enough nitrogen compound is used for an equivalent amount of nitrogen, based on the amount of the element to be oxidized, to be present to form the required nitride or its precursor. In general, even an excess of nitrogen compound is used.

If the nitrogen compound to be reduced is an amine which is liquid at room temperature and not too highly viscous, said amine can be used as such, without adding solvent. However, the proviso for this is also that the nitrogen compound dissolves, to an adequate extent, the substance which increases the conductivity. According to the invention, the use of a solvent is preferred. The use of a solvent is indicated, in particular, if the nitrogen compound used is one with low boiling point, i.e. in particular, a boiling point below room temperature, such as is the case, for example, for ammonia, methylamine and dimethylamine. Alternatively or additionally to this, the electrolysis cell may be cooled in a suitable manner during the electrolysis. If a solid nitrogen compound is used, the use of a solvent which is able to dissolve the said nitrogen compound, the substance which increases the conductivity and optionally also the electrolysis product, is essential.

Suitable solvents which are preferred according to the invention are described in more detail below.

The third component which is used in the process according to the invention is a substance which increases the conductivity and which will be designated as conducting salt below.

In principle, any salt may serve as conducting salt which is soluble in the nitrogen compound or the mixture of nitrogen compound and solvent and dissociates to an adequate extent therein so that a satisfactory conductivity is ensured during the electrolysis. For example, purely inorganic salts may serve as conducting salts. Examples of these are alkali-metal and alkaline-earth halides, in particular, the fluorides, chlorides and bromides of lithium, sodium, potassium, calcium and magnesium. Specific examples of these are LiCl, NaF, NaCl, NaBr, FK, KCl, $CaCl_2$ and $MgCl_2$.

Further preferred examples of conducting salts are anionic surfactants, such as, for example, the commercially available alkyl and alkylaryl carboxylates, sulfates and sulfonates of alkali metals, in particular sodium, for example sodium lauryl sulfate, sodium dodecyl sulfate, sodium benzenesulfonate etc.

Equally, cationic surfactants, for example amine salts of hydrohalic acids can be used, according to the invention, as conducting salts.

As conducting salts, use is preferably made of ammonium salts of the general formula $$R_3NR'^{\oplus}X^{\ominus}$$

in which R and R' are defined as above for the amines of the formula NRR'H, including the preferred radicals R and R', and X stands for F, Cl, Br, I, $ClO_4$, $BF_4$ and/or $PF_6$. According to the invention, mixtures of the abovementioned conducting salts may also be used.

Particularly preferred ammonium salts of the above general formula are those in which R stands for alkyl and R' for H or alkyl.

Obviously, (ammonium) salts derived from other inorganic and organic acids, for example, sulfates, nitrates, phosphates, carbonates, hexafluorosilicates, acetates, formates, oxalates etc., may also be used.

If a particularly pure nitride final product is desired, particularly preferred cations and anions are those which, on heating the electrolysis product to elevated temperatures, decompose to form volatile substances, such as, for example, ammonium cations and halides.

If oxide-free nitrides are desired, the conducting salt should not contain any oxygen in the molecule. However, it is also possible to deliberately introduce elements via the conducting salt, both via the cation and via the anion of the same, which are required to be present in the subsequent ceramic final product, for example, boron (tetrafluoroborates), silicon (hexafluorosilicates) and calcium (for example, via calcium chloride, but also via $CaH_2$ or $Ca(NH_2)_2$.

As already mentioned, according to the invention, mixtures of various conducting salts, in particular conducting salts of various types, such as, for example, cationic and anionic surfactants, can be used together provided they are compatible with each other.

According to the invention, the conducting salt may also be produced in situ, for example, from the corresponding amine and alkyl halide. In particular, use may be made as amine of the compound which is later to be used also as nitrogen compound. For in situ production, the conducting salt, for example ammonium salt, is first produced (if necessary, in the presence of the solvent) and then the nitrogen compound is added.

The amount of conducting salt used should be at least large enough to ensure an adequate conductivity. In principle, no limits are set in the upward direction, but steps should be taken to ensure that the conducting salt dissolves in the nitrogen compound and, if necessary, the solvent virtually completely and does not increase the viscosity too considerably.

If a solvent is to be, or has to be, used, in particular, because the nitrogen compound is too volatile or solid and/or the conducting salt does not dissolve to an adequate extent, according to the invention, one is chosen which is miscible with the nitrogen compound to an adequate extent or adequately dissolves the latter, which dissolves the conducting salt or solvates its ions well and which preferably also keeps the product of the electrolysis in solution. In addition, it should be inert under the electrolysis conditions, i.e. it should not react either with the nitrogen compound or with the electrolysis product.

The boiling point of the solvent depends on the electrolysis temperature chosen or the temperature which is established during the electrolysis. Preferably, the boiling point of the solvent is above room temperature. In addition, it should be easy to volatilize by heating, or decompose on heating and form volatile decomposition products in this process.

If a particularly pure nitride final product is desired, the solvent should also be correspondingly pure, in particular it should not contain any moisture and as little dissolved oxygen as possible. If necessary, the solvent is dried before use, for example, with molecular sieves, and treated with an inert gas, such as nitrogen. A careful purification of the solvent is indicated, in particular, if an oxide-free nitride is required to be obtained.

Preferred solvents are polar, aprotic solvents, such as amides (for example, dimethylformamide and dimethylacetamide), nitriles (for example, acetonitrile and propionitrile), esters (for example, ethyl acetate, ethylene carbonate and propylene carbonate), ketones (for example, acetone and methyl ethyl ketone) and ethers (for example, tetrahydrofuran).

Particularly preferred are nitriles, in particular acetonitrile, and ethylene and propylene carbonate because of their high polarity.

If a particularly pure nitride is to be produced, the solvent should preferably not contain any atoms other than C, H and N in the molecule.

Obviously, mixtures of solvents may also be used according to the invention, at least provided they fulfil the above specified conditions.

The amount of the solvent naturally depends on the type and quantity of the substances to be dissolved. In general, the amount of solvent may be varied within a wide framework. As a rule, large amounts of solvent are less preferred for economic reasons. If, however, the product produced by the electrolysis is to be used, for example, for coatings, and accordingly also to be deposited on a substrate, the use of large amounts of solvent in the electrolysis may also be appropriate. However, in this case, too, a more substantial dilution is only undertaken after terminating the electrolysis.

The other electrolysis conditions are, according to the invention, those which are generally standard in this field.

The applied voltage should be high enough to oxidize the element and to reduce the nitrogen compound and should preferably be higher, for example, at least 1 to 5 volts higher, than the calculated value resulting theoretically from the oxidation and reduction potentials. Said theoretical value depends on the protolysis constant which depends, in turn, on the nature and purity of the element to be oxidized, and on the nature of the nitrogen compound, of the conducting salt and of the solvent.

In the case of aluminum, a voltage of preferably not less than 2 volts is applied. In principle, no limits are set in the upward direction, but it should be noted that the more current flows, the higher the voltage and that, accordingly, the more energy is liberated which heats up the electrolysis mixture. Accordingly, the maximum voltage which can be used depends not least on the construction of the electrolysis cell, on the nature of the electrolyte and of the solvent, and also on the efficiency of the cooling of the electrolysis cell. In the case of the oxidation of aluminum, for example, voltages of 100 volts and over may be used.

Higher current densities, and consequently a better energy yield, may be achieved inter alia by higher conducting salt concentrations and a more polar solvent which preferably has a relatively high boiling point.

The anode comprises or is composed of the element or elements to be oxidized. Preferably, a cathode of the same material is used. This makes it possible, by constantly or occasionally reversing the polarity of the electrodes, to use the latter simultaneously to produce the nitride by oxidizing the electrode material. The electrodes may be designed, for example, as plates. For example, two or more aluminum plates may be arranged in the electrolysis cell, plates with opposite polarity being kept at a distance by an insulating material (for example, shim of plastic, such as, for example, Teflon or polyethylene), while plates of the same polarity are connected to each other conductively by, for example, aluminum shims. The shorter the distance between the plates of opposite polarity, the higher the current density.

The electrolysis temperature, which may also alter during the electrolysis, depends, in particular, on the boiling point of the nitrogen compound and of the solvent. In the case of volatile components, cooling of the electrolysis cell is advisable. This also applies, in particular, if electrolysis is carried out with high current densities so that the heat generated thereby can be removed more easily. Since hydrogen is produced in the electrolysis, it is preferable to work with oxygen excluded (development of oxyhydrogen gas!), i.e. in vacuo and, in particular, under an inert protective gas, such as argon or nitrogen. Ammonia may also be used as protective gas.

The electrolysis may be performed not only batchwise, but also (semi) continuously. In the latter case, use is made, for example, of an electrolysis cell having an inlet for nitrogen compound, conducting salt and, if necessary, solvent and an outlet for the electrolysis mixture. In that case, the electrolysis has to be interrupted only from time to time in order to renew the electrodes (anodes).

After the electrolysis, the electrolysis mixture is preferably freed from volatile constituents by converting said constituents to the gaseous state. This may be carried out, for example, by applying vacuum, heating or a combination of these processes. A specific process which serves this purpose is, for example, spray drying, which is performed, for example, at temperatures from 200 to 250° C. Blowing, for example, inert gas across may also be used to volatilize the volatile constituents. The latter process is to be recommended, for example, if the electrolysis mixture is deposited on a substrate for coating purposes.

The volatile constituents include, for example, unreacted nitrogen compounds and solvent which may be present. Volatile decomposition products which originate from the thermal decomposition of the conducting salt and/or the decomposition of the nitride precursor to form the nitride, may also be formed on heating. For heating, in particular, temperatures of 150° to 300° C. are suitable. Provided a vacuum is not applied simultaneously, it is advisable to use a protective gas, in particular, if a particularly pure, oxide-free nitride is to be produced.

Towards the end of the removal of the volatizable components, an increase in the viscosity occurs until a gel body is finally left behind. A fine, pulverulent product can be obtained if these gel bodies are ground. Alternatively, the volatilization can be performed under vacuum, in particular, towards the end, as a result of which the gel body being formed swells up and becomes extremely porous and can consequently be comminuted (ground) more easily.

Before or during the volatilization stage, (solid) additives, for example, materials or precursors of materials which are to be present in the desired ceramic final product, may be added to the still liquid electrolysis mixture. In the case of the production of aluminum nitride, examples of these are, for example, sintering aids, ceramic fibers or whiskers for composite ceramics (for example, those composed of $Al_2O_3$, SiC or $ZrO_2$) or ceramic powders (for example, composed of $Si_3N_4$, BN, TiN, GaN, $TiB_2$, $B_4C$ or SiC). The individual grains of the powders, the fibers or whiskers are consequently coated with a uniform gel layer. This embodiment offers the advantage that superfine aluminum nitride crystallites are accumulated around the individual grains of the powders, fibers or whiskers. This is manifested in the subsequent sintering in an increase in the sintering activity and a very uniform distribution of the individual components.

As already mentioned, a further modification of the process is to apply the liquid electrolysis mixture, for example, by immersion, spraying or brushing, to a solid substrate before or after the partial evaporation of volatile components and to convert them to the solid nitride (aluminum nitride) by heat treatment. This modification makes it possible to apply a ceramic coating of the nitride to a carrier material. This may be of advantage, for example, in the jointing technique.

Simultaneously, or preferably after, the volatilization stage, i.e. after the gel body has been obtained, the product is calcined by heating it to a temperature of preferably at least 500° C. Particularly in the case of the production of AlN, calcination temperatures of 600° to 1,300° C. and, in particular, 750° to 1,100° C., are particularly preferred. Normally, the calcination temperature should be below the sintering temperature of the respective nitride material. The higher the calcination temperature, the lower the subsequent reactivity of the product with air (atmospheric oxygen and moisture). On the other hand, the mean size of the crystallites increases with the calcination temperature. Thus, for example, in the case of the production of aluminum nitride, an amorphous product is obtained at calcination temperatures below 750° C., at temperatures above 750° C., hexagonal aluminum nitride with a crystallite size of less than 30 nm is produced and at temperatures exceeding 1,100° C., the X-ray diffractometer pictures, for example, are identical to those of aluminum nitride which is obtained by high-temperature processes (see the description given at the beginning of existing processes).

The calcination is preferably performed either under vacuum or a protective gas. Suitable protective gases are, in particular, noble gases, such as, for example, argon, or nitrogen. Ammonia is, however, preferably used as protective gas. Mixtures of protective gases (for example, argon and nitrogen or nitrogen and ammonia) may also be used.

During the calcination, residues of nitrogen compound(s), solvent, and also decomposition products, in particular of conducting salt and/or nitride precursor, are removed.

Obviously, volatilization and calcination can also be implemented as a single stage. In this case it is particularly advantageous if use is made of the socalled spray calcining in which the product from the electrolysis stage is sprayed along with a stream of inert gas into a tube heated, for example, to 800° to 1,000° C.

For stipulated properties of the nitride final product, the calcination time required depends, on the one hand, on the nature of the material to be calcined and, on the other hand, on the calcination temperature. When in doubt, the calcination time should be increased in preference to the calcination temperature.

In the case of the batchwise electrolysis process, electrolysis, volatilization and calcination may optionally be performed in the same vessel (for example of quartz glass).

Compared with the known process, the process according to the invention has a number of decisive advantages which will be pointed out below in more detail with reference to the example of the production of aluminum nitride.

The process according to the invention offers, for example, the advantage that aluminum nitride with high sintering activity and having a very small crystallite size (below 30 nm) can be produced. This is very suitable for the production of aluminum nitride ceramic or ceramic containing aluminum nitride. Aluminum nitride which has been produced in the conventional manner at elevated temperatures, usually 1,200° to 1,500° C. has a markedly lower sintering activity. Pressureless sintering without adding sintering aids is therefore not possible. Sintering under pressure is, however, an elaborate and expensive process. In addition, only bodies with simple geometry can be produced by simple hot pressing. Although isostatic hot pressing makes it possible to produce complicated molded bodies the technology required is still more elaborate and more expensive than uniaxial hot pressing.

On the other hand, the use of sintering aids (usually $Y_2O_3$ or CaO in the case of aluminum nitride) results in the appearance of oxidic foreign phases which form liquid or glass phases at high temperatures and consequently markedly impair the mechanical strength of the nitride ceramic when used at high temperature. In addition, the thermal conductivity of aluminum nitride is impaired by the appearance of foreign phases. Moreover, the chemical resistance of aluminum nitride decreases markedly compared with metal melts as a result of the appearance of oxidic foreign phases.

If sintering aids are used, the desired properties are consequently impaired for using aluminum nitride ceramic or ceramic containing aluminum nitride as a high temperature raw material (requirement: high strength at high temperatures), as a substrate material in electrotechnology (requirement: high thermal conductivity) and as crucible material for metallurgy (requirement: high chemical resistance compared with metal melts). On the other hand, the use of aluminum nitride produced according to the invention and having a high sintering activity makes it possible to produce aluminum nitride ceramic which does not have all the negative properties which are due to the use of sintering aids.

It is particularly the use as substrate material which requires starting powders of uniformly high purity since only they guarantee high purity and homogeneity of the ceramic finished product. The thermal conductivity required for this use drops by orders of magnitude if contaminants are present. Since the reaction products and the reaction atmosphere can remain free of contact with oxygen during the electrolysis process described with subsequent drying and calcining, the oxygen content of the powder, and consequently of the ceramic, can be kept at an extremely low level. This is an unconditional requirement for the occurrence of high thermal conductivity.

According to the invention, with calcination temperatures, in particular, in the range from 750° to 1,100° C., powders can be obtained which have a high bulk density and a good moldability and are therefore very suitable for the subsequent processing procedure. From the aluminum nitride obtained which has high sintering activity, single-phase aluminum nitride ceramic can be manufactured without adding sintering aids. Furthermore, it is also suitable for manufacturing ceramic which does not contain exclusively aluminum nitride. For this purpose, the calcined powder can be mixed with other ceramic powders subsequent to the third stage of the process and subsequently sintered. Here the powder with high sintering activity acts as a sintering aid and consequently also makes possible the sintering of powders which cannot be sintered without adding sintering aids.

As typical examples, mention may be made in this connection of ceramics such as $Si_3N_4/AlN$, BN/AlN, TiN/AlN, GaN/AlN or SiC/AlN. In all these cases, sintering without adding (usually oxidic) sintering aids was not possible or possible only under technologically elaborate conditions (for example, pressure). As a futher typical example, mention may be made of the production of composite ceramic using ceramic fibers or whiskers. For this purpose, ceramic fibers or whiskers are mixed with aluminum nitride powder having high sintering activity and subsequently sintered. Aluminum nitride with low sintering activity which has been produced in another manner, for example by high-temperature processes, can be pressurelessly sintered without adding further sintering agents by adding aluminum nitride with high sintering activity which can be prepared according to the invention.

The following examples illustrate the present invention.

EXAMPLE 1

FIG. 1 shows an arrangement for performing the electrolysis according to the invention. This figure shows a glass vessel (1) with reflux condenser (2) mounted on it and electrode lead throughs (3), in the interior of which vessel there are two helically wound aluminum electrodes (4) and also the electrolyte (5) (nitrogen compound, conducting salt and solvent). FIG. 1 further shows a water bath (6) for cooling the electrolysis cell, a dropping funnel (7) from which the electrolyte (5) can be introduced into the electrolysis cell through the reflux condenser (2), optionally after the already completely electrolyzed electrolysis mixture has been removed from the electrolysis vessel through the drain (8) by means of the stop cock (9). Also shown are a supply and a removal line (10,11) for the protective gas (argon).

The composition of the electrolyte (5) is as follows:
150 ml of n-propylamine,
75 ml of acetonitrile,
11 g of tetrabutylammonium bromide.

Applied between the electrodes is a direct voltage of 30 V, the resulting current density is approx. 25 $A/m^2$ and the electrolysis time is 6 hours.

The electrolyte is subsequently removed from the electrolysis vessel and heated to 150° C. under vacuum (approx. 20 hPa). As a result of this, a highly viscous liquid is obtained which, on applying a vacuum further, finally solidifies to form a polymeric foam. Said foam can be converted to powder after further drying in vacuo by simply shaking. The powder is calcined in a stream of ammonia at 750° C. and subsequently isostatically molded at a pressure of 480 MPa, and then sintered pressurelessly at 1,800° C. to form a sintered body having a density of > 99% of the theoretical density of pure aluminum nitride.

EXAMPLE 2

The electrolysis described in Example 1 is repeated, with the difference that the electrodes comprise aluminum plates 1 mm thick. The electrodes are kept at a distance with the aid of shims of insulating material (for example, Teflon or polyethylene).

Plates of the same polarity are connected to each other conductively with the aid of aluminum shims. The achievable current densities are 60 A/m$^2$ with an applied voltage of 5.5 V (electrolysis time: approx. 8 hours).

After the electrolysis, the electrolysis mixture is removed from the electrolysis vessel and added to commercially available aluminum nitride produced by a hightemperature process and mixed well therewith. Subsequently, the solvent and the excess amine are distilled off and calcination is carried out at 750° C. After molding, pressureless sintering is carried out at 1,800° C. The sintered bodies obtained have a density of > 99% of the theoretical density of pure aluminum nitride. Performance in accordance with this example has the advantage that the mean grain size of the ceramic obtained can be controlled by the mean grain size of the aluminum nitride powder added and produced by a high-temperature proces. The mean grain size is an important parameter of the ceramic and, in the case of aluminum nitride ceramic, determines, in particular, the strength and the thermal conductivity.

EXAMPLE 3

The procedure is as described in Example 2, but instead of the commercially available aluminum nitride powder produced by a high-temperature process, silicon nitride powder, which is also commercially available and has been produced by a high-temperature process, is added. The powder is dried, calcined and molded by the process described in Example 2. The ceramic, sintered at 1,850° C., has only a low porosity. The grain size can be controlled in this case, too, by the grain size of the silicon nitride powder added. Pure silicon nitride produced by a high-temperature process can be sintered pressurelessly only by adding fairly large amounts of usually oxidic sintering aids (for example, Al$_2$O$_3$, Y$_2$O$_3$). In contrast to aluminum nitride, these decisively reduce the hightemperature strength.

EXAMPLE 4

The process is as in Example 2, but fine quartz powder (mean grain size: 1 μm) is added instead of the commercially produced aluminum nitride powder.

Drying, calcining and molding are carried out in the same manner as described in Example 2. Subsequently, pressureless sintering is carried out at 1,500° C. The ceramic obtained has an oxygen content corresponding to the SiO$_2$ added.

Example 4 shows a possibility for producing socalled SiAlON ceramic.

EXAMPLE 5

The aniodic dissolution of the aluminum is performed with the arrangement described in Example 2, but the composition of the electrolyte is as follows:
100 ml of acetonitrile,
100 ml of dimethylformamide,
50 ml of n-butylamine,
5 g of tetraethylammonium bromide.

After one hour, the electrolysis is terminated and the still relatively low-viscosity mixture is removed from the electrolysis vessel and subsequently applied by spraying, immersion or brushing under protective gas to the surface of a ceramic (for example, of aluminum oxide). The thickness of the liquid film obtained is 200 μm. The further treatment is performed as follows:

Drying of the film in a stream of dry nitrogen at 25° C. (3 hours);

slow heating in a stream of nitrogen—to 150° C. at 10° C./h; —to 300° C. at 20° C./h; —to 600° C. at 50° C./h; —to 1,650° C. at 200° C./h.

The slow heating, in particular in the lower temperature range, has the advantage that the volatile compounds are able to escape slowly and the coating of aluminum nitride obtained is crack free. Under the conditions specified above, an aluminum nitride coating is produced which has a thickness of approx. 7 μm and is firmly joined to the aluminum oxide via oxynitride phases.

EXAMPLE 6

The anodic dissolution of the aluminum is performed with the arrangement described in Example 2, and the nature and amount of the other electrolysis materials used are also identical to those specified in Example 2. The electrodes are composed, however, of an aluminum/silicon alloy containing 50% silicon. The electrolysis is performed with a current density of approx. 25 A/m$^2$ (required voltage: approx. 7 V, electrolysis time: approx. 14 hours). The electrolyte is subsequently removed from the electrolysis vessel and dried by the process described in Example 1, and subsequently calcined in a rotary tubular furnace under argon at 900° C. The powder obtained is ground for 5 hours in a plastic drum using aluminum nitride grinding bodies and subsequently uniaxially molded.

At a sintering temperature of 1,950° C., a ceramic having low porosity (<3%) is obtained. The chemical analysis reveals an N:C ratio of approx. 1:1. The present example consequently illustrates a possibility for producing an AlN/SiC composite ceramic in situ.

If the electrolyte obtained is calcined using dried ammonia instead of argon, the product obtained is virtually free of carbon. It can subsequently be sintered at 1,850° C. to form nitride ceramic having porosities of < 2%.

EXAMPLE 7

Following the anodic dissolution of the metallic aluminum described in Example 2, 1% of CaH$_2$ (based on the amount of aluminum nitride expected from the loss in weight of the electrodes) is added to the electrolysis mixture removed from the electrolysis vessel. The powder, dried by the process described in Example 1, is calcined under dry NH$_3$ and, after molding at 1,500° C., is sintered to form a dense ceramic with a porosity of 1%. The mean grain size is approx. 0.3 μm.

The production of aluminum nitride ceramic with such a small grain size has hitherto not been described in the literature and is almost impossible without pressure starting from powders prepared by a high-temperature process since the sintering temperatures, which are necessary to produce aluminum nitride ceramic with porosities of < 1% with the assistance of sintering aids, are normally 1,700° to 1,850° C. At these temperatures substantial grain growth already occurs and the mean grain sizes of the ceramics obtained are then normally 5 to 20 μm.

A procedure following the present example accordingly suggests itself if low sintering temperatures or, alternatively, small mean grain sizes are desired, but the foreign phases occurring as a result of adding the calcium compound can be accepted.

EXAMPLE 8

Following the anodic dissolution of metallic aluminum described in Example 5, the electrolysis mixture is dried after removal from the electrolysis vessel in a stream of nitrogen in a commercially available spray drier. In this case, hollow spheres of aluminum compounds are obtained which can subsequently be further processed as already described.

The advantage which results from the use of a spray drier is that, in this case, very fine powders can be obtained which have hardly any tendency to agglomeration and are therefore very suitable for the subsequent processing procedure. In addition, spray drying is a widespread process in ceramic technology which is also used on a large industrial scale.

EXAMPLE 9

Following the anodic dissolution of metallic aluminum described in Example 5, the electrolysis mixture is removed from the electrolysis vessel. Subsequently, said mixture is sprayed with the aid of a stream of nitrogen into a hot tube at approx. 800° C. In this case, the drying and the calcining is consequently perfomed in one step, and this is a simplification compared with the process already described. In this case, fine, readily moldable powders are obtained which are very suitable for the subsequent processing procedure.

EXAMPLE 10

Following the anodic dissolution of the metallic aluminum performed in accordance with Example 2, the electrolysis mixture is removed from the electrolysis vessel and enough solvent is distilled off by evacuation and heating for a liquid of high viscosity to be left behind. The resulting product is then introduced into an autoclave filled with nitrogen in which there is a molded part composed of silicon carbide ceramic of high porosity (for example, of recrystallized silicon carbide having a porosity of approx. 20%) so that said molded part is completely covered by the evaporated-down electrolysis mixture. Subsequently, the autoclave is evacuated slightly for a short time (only down to approx. 100 hPa, in order to avoid a violent escape of the solvent). Then a nitrogen pressure of approx. 20 MPa is applied to the autoclave, as a result of which the pores of the ceramic structural part placed inside are virtually completely filled with the electrolyte mixture. Subsequently, the autoclave is heated to approx. 300° C., a pressure of 20 MPa being maintained. Then the pressure is slowly reduced to normal pressure, and solvent and excess amine escape. Under these circumstances, the evaporation of the solvent must take place very slowly so that the electrolyte is not forced out of the ceramic again:
—20 to 5 MPa at 2 MPa/h;
—5 to 2.5 MPa at 1 MPa/h;
—2.5 to 1.0 MPa at 0.5 MPa/h;
—1.0 to 0.4 MPa at 0.2 MPa/h;
—0.3 to 0.1 MPa at 0.05 MPa/h.

Subsequently, the autoclave is cooled to room temperature, the infiltrated silicon carbide ceramic is removed from the autoclave under protective gas and the excess polymer situated on the surface is removed mechanically. The infiltrated SiC structural part is subsequently slowly heated under dried ammonia. Heating rate:
25° to 280° C. : 100° C./h;
280° to 650° C. : 20° C./h;
650° to 1000° C. : 100° C./h;
1000° to 1700° C. : 300° C./h.

The silicon carbide ceramic obtained, which is infiltrated with aluminum nitride, has a markedly lower porosity than the original SiC ceramic. The pressure impregnation can be repeated following the temperature treatment. In this case, silicon carbide ceramics which are infiltrated with aluminun nitride are obtained which are virtually gastight.

The infiltration with aluminum nitride is not possible with conventional technology and has the advantage over infiltration with oxide ceramic that aluminum nitride does not form any liquid phases and does not enter into any chemical reactions with the SiC at the temperatures used here, and does not form any mixed phases with SiC either.

The process described may also be used to seal or to proof porous fiber-reinforced SiC structural parts which have been produced, for example, via the CVI (Chemical Vapor Infiltration) technique.

EXAMPLE 11

Following the anodic dissolution of metallic aluminum described in Example 2, the electrolysis mixture is removed from the electrolysis vessel and mixed with an organosilicon polymeric compound (for example, polysilastyrene). Evacuation and heating in accordance with Example 1 produces a polymeric powder which is calcined at 750° C. under ammonia.

The grinding, molding and sintering is carried out in the manner described in Example 6. The ceramic obtained of low porosity (<3%) exhibits an N:C ratio of 1:1. This illustrates a further possibility of producing an AlN/SiC composite ceramic in situ.

What we claim is:

1. A process for the production of nitrides or nitride precursors for ceramic materials, which comprises anodically oxidizing by electrolysis at least one element of said ceramic materials in the presence of at least one nitrogen-containing compound which is reduced during said electrolysis, and at least one conducting salt which increases conductivity, wherein said at least one ceramic material element is selected from the group consisting of Ca, Mg, B, Al, Ga, Si, Sn, V, Ti, Zr, Cr, Mo, W, Y, Nb, Ta, Zn and the lanthanides and mixtures thereof.

2. The process as claimed in claim 1, wherein the element is selected from the group consisting of B, Al, Si and Ti.

3. The process as claimed in claim 2, wherein the element is Al.

4. The process as claimed in claim 1, wherein the nitrogen-containing compound comprises a primary or secondary, aliphatic, aromatic or araliphatic amine or NH$_3$ or mixtures thereof.

5. The process as claimed in claim 4, wherein said aliphatic group is a C$_1$-C$_{12}$ alkyl group, C$_3$-C$_{10}$ cycloalkyl group or a C$_2$-C$_{10}$ alkylene group which is uninterrupted or is interrupted by a heteroatom.

6. The process as claimed in claim 4, wherein said aromatic group is a C$_6$-C$_{20}$ aryl group.

7. The process as claimed in claim 4, wherein said araliphatic group is a C$_6$-C$_{20}$ aryl group having a C$_1$-C$_{12}$ alkyl substituent.

8. The process as claimed in claim 1, wherein the conducting salt, which increases conductivity, comprises at last one ammonium salt of the formula:

$$R_3NR'^+X^-$$

wherein the R radicals, which are the same or different, are straight-chain or branched-chain alkyl, alkenyl, alkynyl, cycloalkyl, cycloalkenyl, aralkyl or aryl groups, or two R radicals together form an alkylene group, R' represents hydrogen or has the same definition as for said R radicals, and X is F, Cl, Br, I, ClO$_4$, BF$_4$ or PF$_6$ or a mixture thereof.

9. The process as claimed in claim 8, wherein R is alkyl, and R' is hydrogen or alkyl.

10. The process as claimed in claim 1, wherein the electrolysis is performed in the presence of a polar, aprotic solvent.

11. The process as claimed in claim 10, wherein said polar, aprotic solvent is a nitrile or an alkylene carbonate or a mixture thereof.

12. The process as claimed in claim 11, wherein said alkylene carbonate is ethylene carbonate or propylene carbonate.

13. The process as claimed in claim 1, wherein the volatilizable constituents are removed after the electrolysis.

14. The process as claimed in claim 13, wherein said volatilizable constituents are removed by heating or under reduced pressure or by a combination thereof.

15. The process as claimed in claim 13, which further comprises adding sintering agents, ceramic fibers, whiskers or ceramic powders or mixtures thereof to the electrolysis mixture before or during the removal of the volatile constituents.

16. The process as claimed in claim 1, wherein the electrolysis mixture is heated to at least 500° C.

17. The process as claimed in claim 16, wherein the electrolysis mixture is heated to at least 500° C. after removing the volatile constituents.

18. The process as claimed in claim 17, wherein the electrolysis mixture is calcinated at temperatures from 600° to 1,300° C.

19. The process as claimed in claim 18, wherein the electrolysis mixture is calcinated at temperatures from 750° to 1,100° C.

20. The process as claimed in claim 18, wherein said calcination is conducted under vacuum or protective gas.

21. The process as claimed in claim 20, wherein said protective gas is selected from the group consisting of nitrogen, argon, ammonia and mixtures thereof.

* * * * *